US011926151B2

(12) United States Patent
Shintani

(10) Patent No.: US 11,926,151 B2
(45) Date of Patent: Mar. 12, 2024

(54) WINDING DEVICE AND PRINTING DEVICE

(71) Applicant: SEIKO EPSON CORPORATION, Tokyo (JP)

(72) Inventor: Akihiro Shintani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 777 days.

(21) Appl. No.: 17/043,557

(22) PCT Filed: Mar. 1, 2019

(86) PCT No.: PCT/JP2019/008050

§ 371 (c)(1),
(2) Date: Sep. 29, 2020

(87) PCT Pub. No.: WO2019/187971

PCT Pub. Date: Oct. 3, 2019

(65) Prior Publication Data

US 2021/0023860 A1 Jan. 28, 2021

(30) Foreign Application Priority Data

Mar. 30, 2018 (JP) ................................ 2018-066429
Nov. 27, 2018 (JP) ................................ 2018-221631

(51) Int. Cl.
*B41J 3/407* (2006.01)
*B41J 11/00* (2006.01)
(Continued)

(52) U.S. Cl.
CPC ............ *B41J 15/16* (2013.01); *B41J 3/4075* (2013.01); *B41J 11/00* (2013.01); *B41J 15/00* (2013.01);
(Continued)

(58) Field of Classification Search
CPC . B41J 3/4075; B41J 15/16; B41J 15/00; B41J 15/02; B41J 15/044; B41J 11/00;
(Continued)

(56) References Cited

U.S. PATENT DOCUMENTS 4,804,152 A 2/1989 Masuda
2015/0174933 A1 6/2015 Kawajiri et al.
2017/0038706 A1 2/2017 Kibayashi et al.

FOREIGN PATENT DOCUMENTS

JP H10-191844 A 7/1998
JP 2015-066913 A 4/2015
(Continued)

OTHER PUBLICATIONS

Apr. 2, 2019 International Search Report issued in International Patent Application No. PCT/JP2019/008050.

*Primary Examiner* — Kristal Feggins
(74) *Attorney, Agent, or Firm* — Oliff PLC

(57) ABSTRACT

A winding device is capable of easily moving a flange portion to a position corresponding to a width of a continuous medium. A winding device that winds a print medium, the winding device including a winding shaft, a winding core portion that is provided to be rotatable on the winding shaft and that winds a continuous medium, a first flange portion that is provided on the winding shaft to be movable in an extending direction of the winding shaft and that guides the continuous medium wound around the winding core portion in a width direction of the continuous medium, a flange-side engaging portion capable of moving integrally with the first flange portion, and a flange moving section that includes a cylindrical cam provided with a cam-side engaging portion that engages with the flange-side engaging portion and that moves the first flange portion to a plurality of flange positions.

11 Claims, 9 Drawing Sheets

(51) Int. Cl.
*B41J 15/00* (2006.01)
*B41J 15/02* (2006.01)
*B41J 15/04* (2006.01)
*B41J 15/16* (2006.01)
*B41J 32/00* (2006.01)
*B65H 18/10* (2006.01)

(52) U.S. Cl.
CPC ............ *B41J 15/02* (2013.01); *B41J 15/044* (2013.01); *B41J 32/00* (2013.01); *B65H 18/10* (2013.01)

(58) Field of Classification Search
CPC ...... B41J 32/00; B65H 18/10; B65H 23/0328; B65H 2301/412; B65H 2301/41368; B65H 2403/511; B65H 18/026; B65H 75/241; B65H 2511/12; B65H 2801/03
See application file for complete search history.

(56) References Cited

FOREIGN PATENT DOCUMENTS

JP 2015-134686 A 7/2015
JP 2019-182656 * 10/2019 ............. B41J 15/16

* cited by examiner

WINDING DEVICE AND PRINTING DEVICE

TECHNICAL FIELD

The present invention relates to a winding device and a printing device which winds a continuous medium.

BACKGROUND ART

In the related art, as disclosed in PTL 1, there is known a winding device which configures a drum portion of an inner cylinder, a first outer cylinder provided with a first flange portion, a second outer cylinder provided with a second flange portion, and a paper core, and the winding device winds a continuous medium.

CITATION LIST

Patent Literature

PTL 1: Japanese Unexamined Patent Application Publication No. 2015-066913

SUMMARY OF INVENTION

Technical Problem

In the winding device of the related art, when assembling a winding mechanism, it is necessary to align the position of the second flange portion in the axial direction with the width of the paper core that matches the width of the continuous medium to be wound and the operation of the positional adjustment of the flange portion is difficult.

An object of the present invention is to provide a winding device and a printing device capable of easily moving the flange portion to a position corresponding to the width of the continuous medium.

Solution to Problem

A winding device of the present invention includes a winding shaft, a winding core portion that is provided to be rotatable on the winding shaft and that winds a continuous medium, a flange portion that is provided on the winding shaft to be movable in an extending direction of the winding shaft and that guides the continuous medium wound around the winding core portion in a width direction of the continuous medium, a flange-side engaging portion capable of moving integrally with the flange portion, and a flange moving section that includes a cam provided with a cam-side engaging portion that engages with the flange-side engaging portion and that moves the flange portion to a plurality of flange positions.

A printing device of the present invention includes a printing section that performs printing on a continuous medium, a winding shaft, a winding core portion that is provided to be rotatable on the winding shaft and that winds the continuous medium, a flange portion that is provided on the winding shaft to be movable in an extending direction of the winding shaft and that guides the continuous medium wound around the winding core portion in a width direction of the continuous medium, a flange-side engaging portion capable of moving integrally with the flange portion, and a flange moving section that includes a cam provided with a cam-side engaging portion that engages with the flange-side engaging portion and that moves the flange portion to a plurality of flange positions.

DESCRIPTION OF EMBODIMENTS

An embodiment of a printing system provided with a tape printing device and a winding device will be described below with reference to the accompanying drawings. In the following drawings, an XYZ orthogonal coordinate system is displayed in order to clarify the disposition relationship of each portion, but it goes without saying that this does not limit the present invention in any manner. The numerical values indicating the number of each portion and the like are merely examples and do not limit the present invention in any manner.

[Outline of Tape Printing Device and Winding Device]

Figure 1:
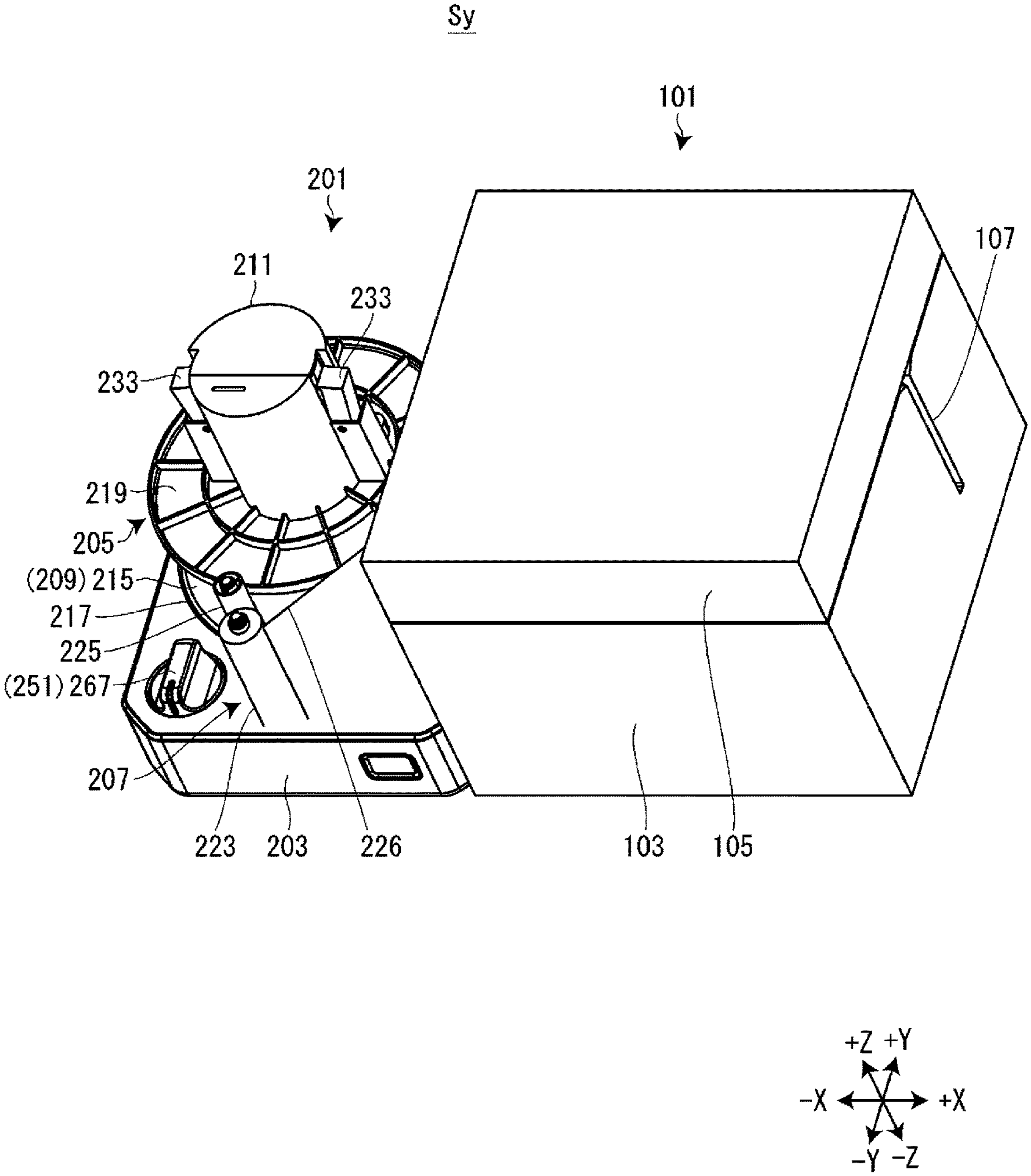
FIG. 1 is a perspective view of a printing system provided with a tape printing device and a winding device according to an embodiment of the present invention.
Figure 2:
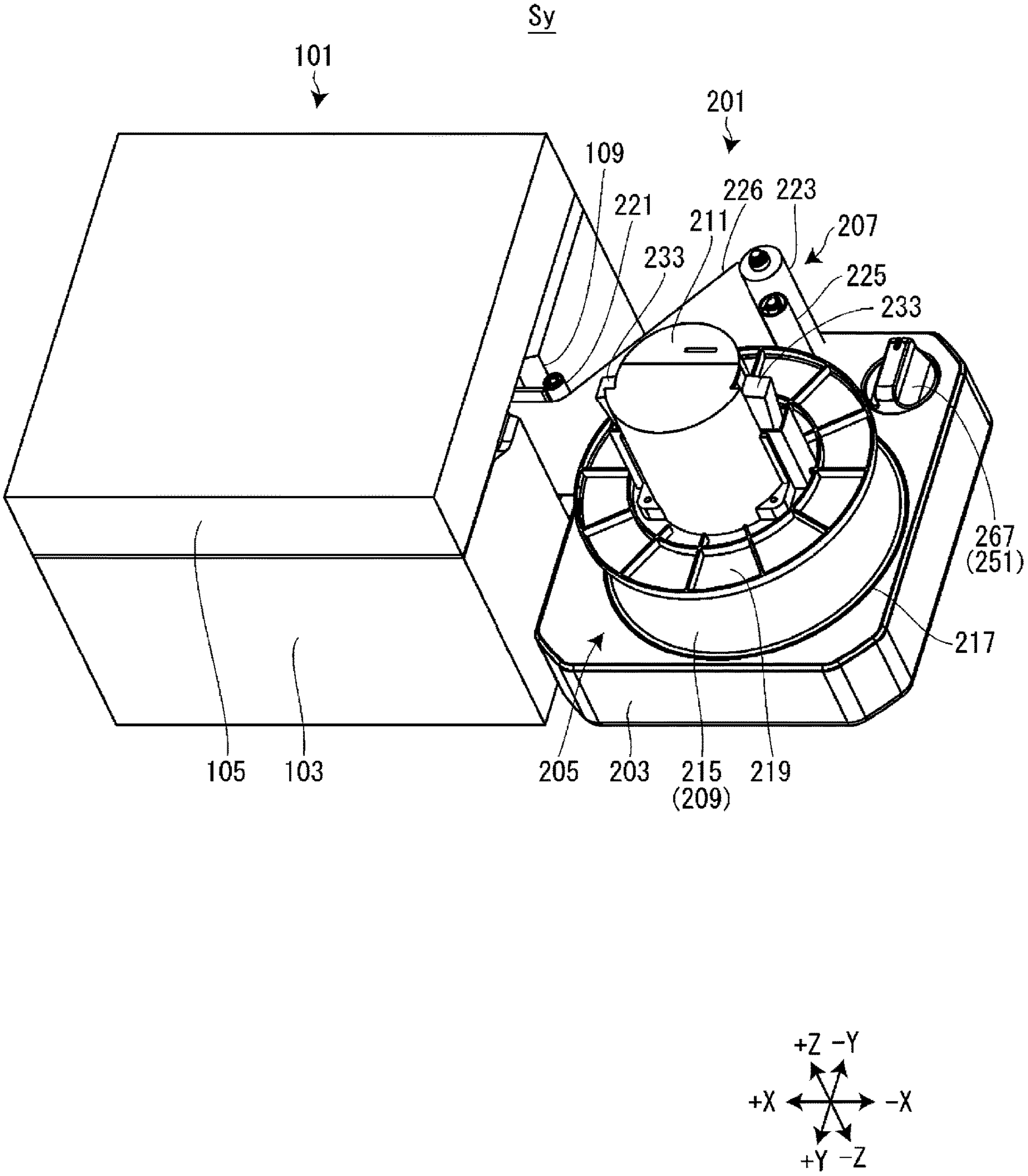
FIG. 2 is a perspective view of the tape printing device and the winding device as viewed from a different angle from FIG. 1.

An outline of a tape printing device 101 and a winding device 201 configuring a printing system Sy will be described with reference to FIGS. 1 and 2. The tape printing device 101 performs printing on a tape 401 (refer to FIG. 3) and feeds the tape 401 subjected to the printing to the winding device 201. The winding device 201 winds the tape 401 fed from the tape printing device 101. The tape 401 is an example of the "continuous medium" in the present invention.

The tape printing device 101 is provided with a device case 103 and a mounting portion cover 105. The device case 103 is formed in a substantially rectangular parallelepiped shape. A tape introduction port 107 is provided on the surface of the device case 103 on the +X side and a tape discharge port 109 is provided on the surface of the device case 103 on the −X side. The tape 401 is introduced into the tape introduction port 107 from outside the tape printing device 101. The tape 401 subjected to the printing is discharged from the tape discharge port 109. A cartridge mounting portion (not illustrated) is provided on the surface of the device case 103 on the +Z side. The mounting portion cover 105 is provided on the +Z side of the device case 103 to be capable of pivoting centered on the end portion on the +Y side. The mounting portion cover 105 opens and closes the cartridge mounting portion. A ribbon cartridge (not illustrated) accommodating an ink ribbon is detachably mounted to the cartridge mounting portion.

A platen shaft 113, a thermal head (not illustrated), and a feed motor 121 (refer to FIG. 7) are provided inside the device case 103. A platen roller (not illustrated) is mounted in a rotatable manner to the platen shaft 113. When the feed motor 121 operates, the platen roller rotates and the tape 401 and the ink ribbon pinched between the thermal head and the platen roller are fed. At this time, the tape 401 is subjected to printing due to the thermal head emitting heat.

The winding device 201 is installed on the tape discharge port 109 side of the tape printing device 101. The winding device 201 is provided with a base portion 203, a winding section 205, and a winding guide section 207.

The base portion 203 is formed in a substantially rectangular parallelepiped shape having a smaller dimension in the Z direction than the device case 103 of the tape printing device 101. A handle portion 267 of the dial 251 is provided to be rotatable on the surface of the base portion 203 on the +Z side. Although details will be described later, the user is capable of moving the winding section 205 in the Z direction by holding the handle portion 267 and rotating the dial 251.

The tape 401 fed from the tape printing device 101 is wound around the winding section 205. The winding section 205 is provided with a winding main body 209 and a winding attachment body 211. The winding main body 209 is provided to be rotatable on the surface of the base portion 203 on the +Z side. The winding attachment body 211 is detachably attached to the winding main body 209 and rotates integrally with the winding main body 209.

The winding main body 209 is provided with a winding core portion 213 (refer to FIG. 4) and a first flange portion 215. The winding main body 209 is provided on the base portion 203 such that the first flange portion 215 is embedded in a circular opening 217 provided in the surface of the base portion 203 on the +Z side. The winding attachment body 211 is provided with a second flange portion 219. The first flange portion 215 and the second flange portion 219 are formed in a substantially disc shape. The winding attachment body 211 is attached to the winding main body 209 such that the second flange portion 219 faces the first flange portion 215. The tape 401 fed from the tape printing device 101 is wound around the winding core portion 213 while being guided in the width direction of the tape 401 by the first flange portion 215 and the second flange portion 219. The first flange portion 215 is an example of the "flange portion" in the present invention.

The winding guide section 207 is provided on the surface of the base portion 203 on the +Z side. The winding guide section 207 guides the tape 401 fed from the tape discharge port 109 of the tape printing device 101 to the winding section 205. The winding guide section 207 is provided with a first guide roller 221, a friction member 223, a second guide roller 225, and a guide wall 226. The first guide roller 221 guides the tape 401 sent from the tape discharge port 109 to the friction member 223. The friction member 223 imparts frictional resistance to the tape 401, thereby suppressing the pulling of the tape 401 to the winding section 205 side. The second guide roller 225 guides the tape 401 fed from the friction member 223 to the winding section 205. The guide wall 226 prevents the tape 401 fed from the first guide roller 221 to the friction member 223 from slackening toward the winding section 205. The second guide roller 225 may or may not be provided depending on conditions such as the specifications of the tape 401 and the winding speed of the tape 401 by the winding section 205.

[Tape]

Figure 3:
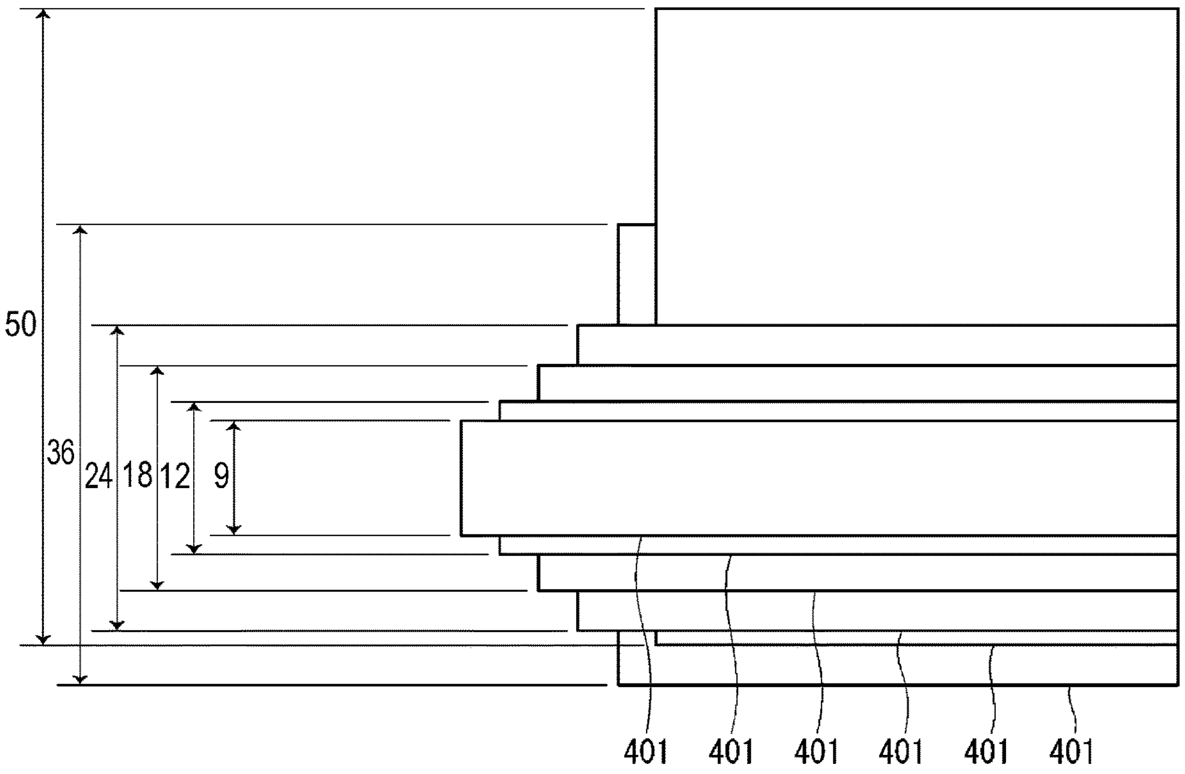
FIG. 3 is a diagram illustrating a plurality of types of tapes having different widths.

The tape 401 will be described based on FIG. 3. There are a plurality of types of the tape 401 having different widths, which includes the six types of 9 mm width, 12 mm width, 18 mm width, 24 mm width, 36 mm width and 50 mm width, for example. Of these, the four types of 9 mm width, 12 mm width, 18 mm width, and 24 mm width are fed in the tape printing device 101 such that the center positions of the tape 401 in the width direction are substantially matched. Therefore, the positions of both ends of the tape 401 in the width direction are different for every width of the tape 401. With respect to the tapes 401 having the 36 mm width and the 50 mm width, the positions of both ends in the width direction of the tapes 401 are different from those of the other tapes 401.

[Winding Main Body]

Figure 4:
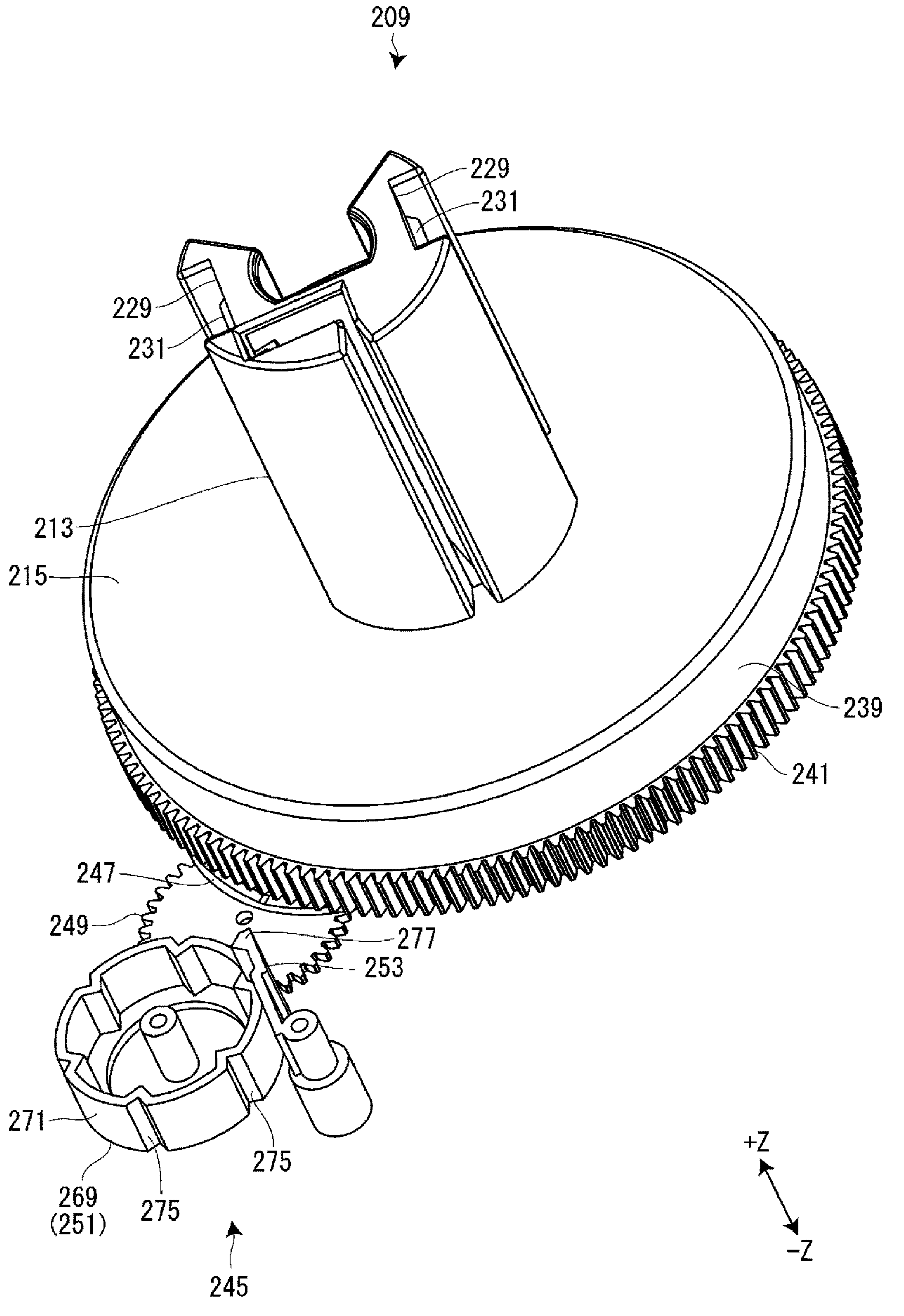
FIG. 4 is a perspective view of a winding main body and a flange moving section.
Figure 5:
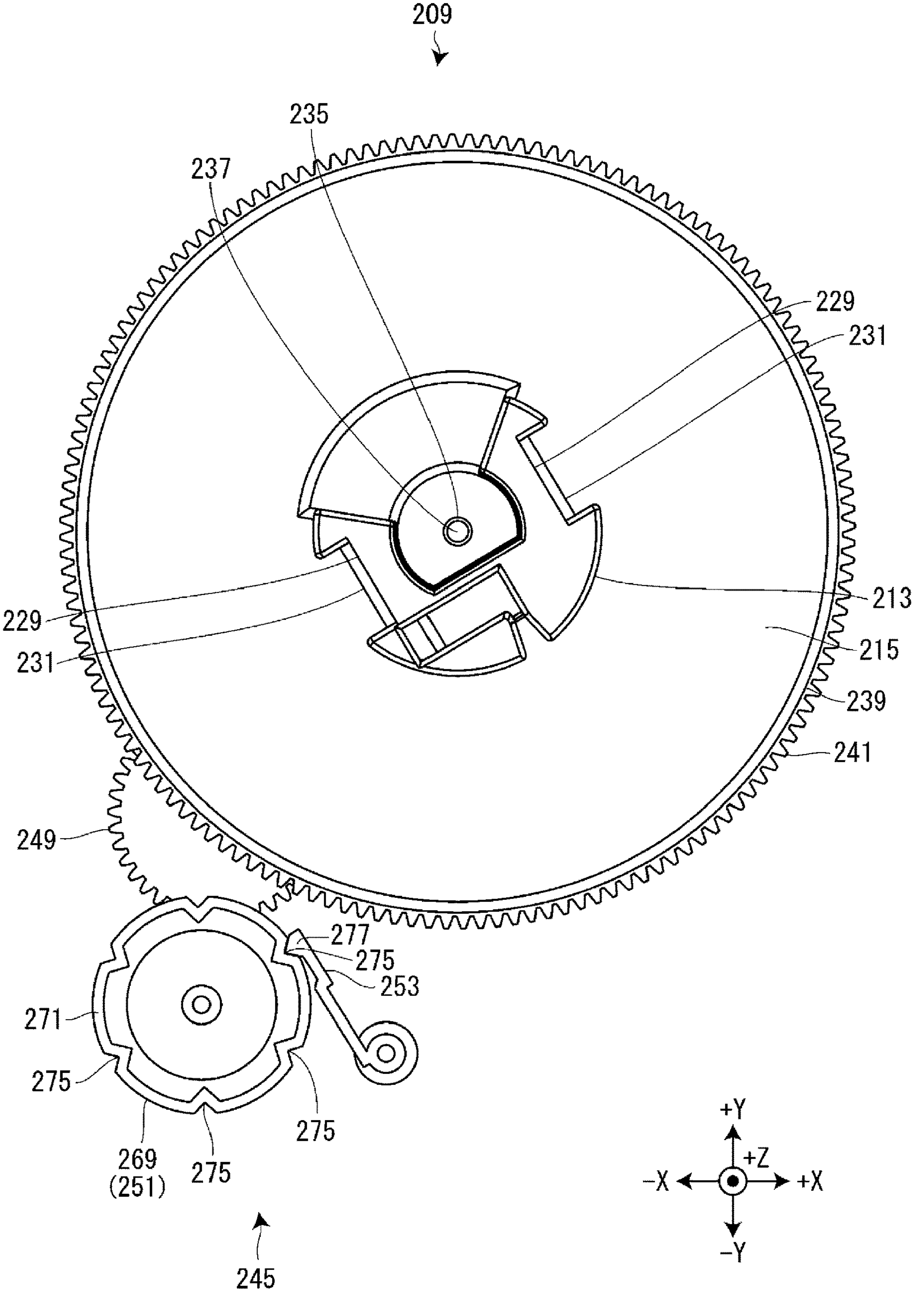
FIG. 5 is a diagram of the winding main body and the flange moving section as viewed from the +Z side.
Figure 6:
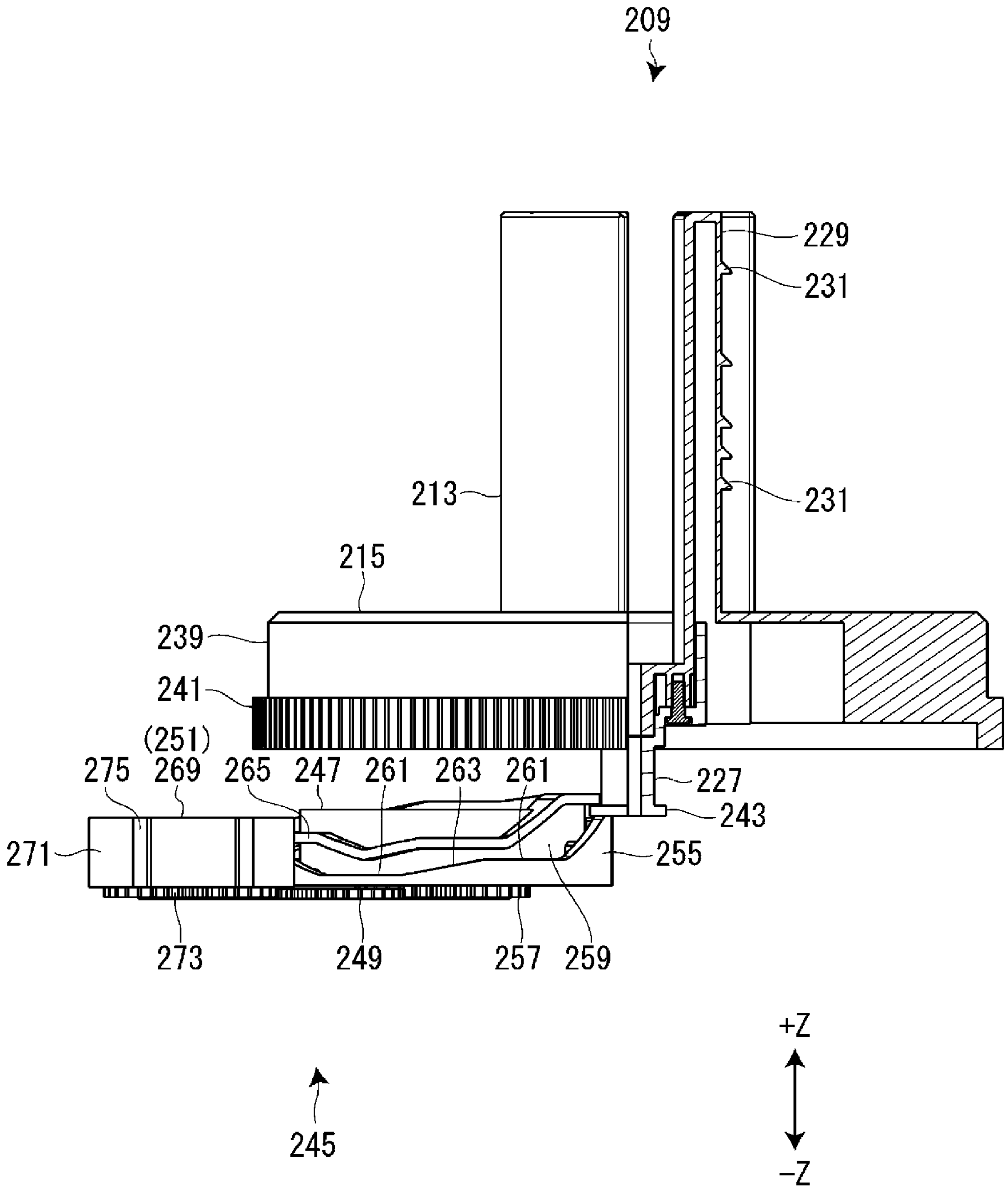
FIG. 6 is a diagram of the winding main body and the flange moving section as viewed from a direction perpendicular to the Z direction and is a diagram illustrating a cross section of a portion of the winding main body.

The winding main body 209 will be described based on FIGS. 4 to 6. The winding main body 209 is provided with a flange-side engaging portion 227 in addition to the winding core portion 213 and the first flange portion 215.

The winding core portion 213 is formed in a substantially columnar shape extending in the Z direction. Two engaging portion forming surfaces 229 are provided on the circumferential surface of the winding core portion 213. Five core-side engaging portions 231 are formed on each of the engaging portion forming surfaces 229 to line up in the extending direction of the winding core portion 213 (refer to FIG. 6). The five core-side engaging portions 231 are provided at positions corresponding to the widths of the five types of tapes 401 from 12 mm width to 50 mm width. A lever-side engaging portion (not illustrated) of a lever 233 (refer to FIG. 1) provided on the winding attachment body 211 engages with the core-side engaging portion 231. The lever-side engaging portion engages with the core-side engaging portion 231, whereby the winding attachment body 211 is attached to the winding main body 209 at a position corresponding to the width of the tape 401.

The first flange portion 215 is provided on the end portion of the winding core portion 213 on the −Z side. The first flange portion 215 and the winding core portion 213 are integrally formed. A shaft insertion hole 235 is provided in the center of the first flange portion 215. A winding shaft 237 extending in the Z direction is inserted into the shaft insertion hole 235. The winding main body 209 is supported by the winding shaft 237 to be rotatable and movable in the extending direction of the winding shaft 237. The first flange portion 215 is positioned in the directions intersecting the extending direction of the winding shaft 237, that is, in the X direction and the Y direction by inserting the winding shaft 237 into the shaft insertion hole 235. The winding shaft 237 is fixed to a winding-side support plate 220 (refer to FIG. 7) embedded in the base portion 203 and projects from the winding-side support plate 220 to the +Z side.

The first flange portion 215 is provided with a non-gear portion 239 on the +Z side and a flange gear portion 241 on the −Z side. The flange gear portion 241 meshes with an output gear 287 (refer to FIG. 7). The engagement between the flange gear portion 241 and the output gear 287 is maintained even when the winding main body 209 moves in the extending direction of the winding shaft 237. The motive power of the feed motor 121 provided in the tape printing device 101 is transmitted to the output gear 287. In other words, the winding section 205 rotates using the feed motor 121 as a drive source. The winding section 205 may be configured to rotate using a motor provided in the winding device 201 as a drive source.

The flange-side engaging portion 227 is fixed to the first flange portion 215 to project from the substantial center of the surface on the −Z side of the first flange portion 215 to the −Z side. An engaging protrusion portion 243 is provided in a flange shape at the tip of the flange-side engaging portion 227. The flange-side engaging portion 227 engages with a cam-side engaging portion 259 described later in the engaging protrusion portion 243.

[Gear Train and Detection Section]

Figure 7:
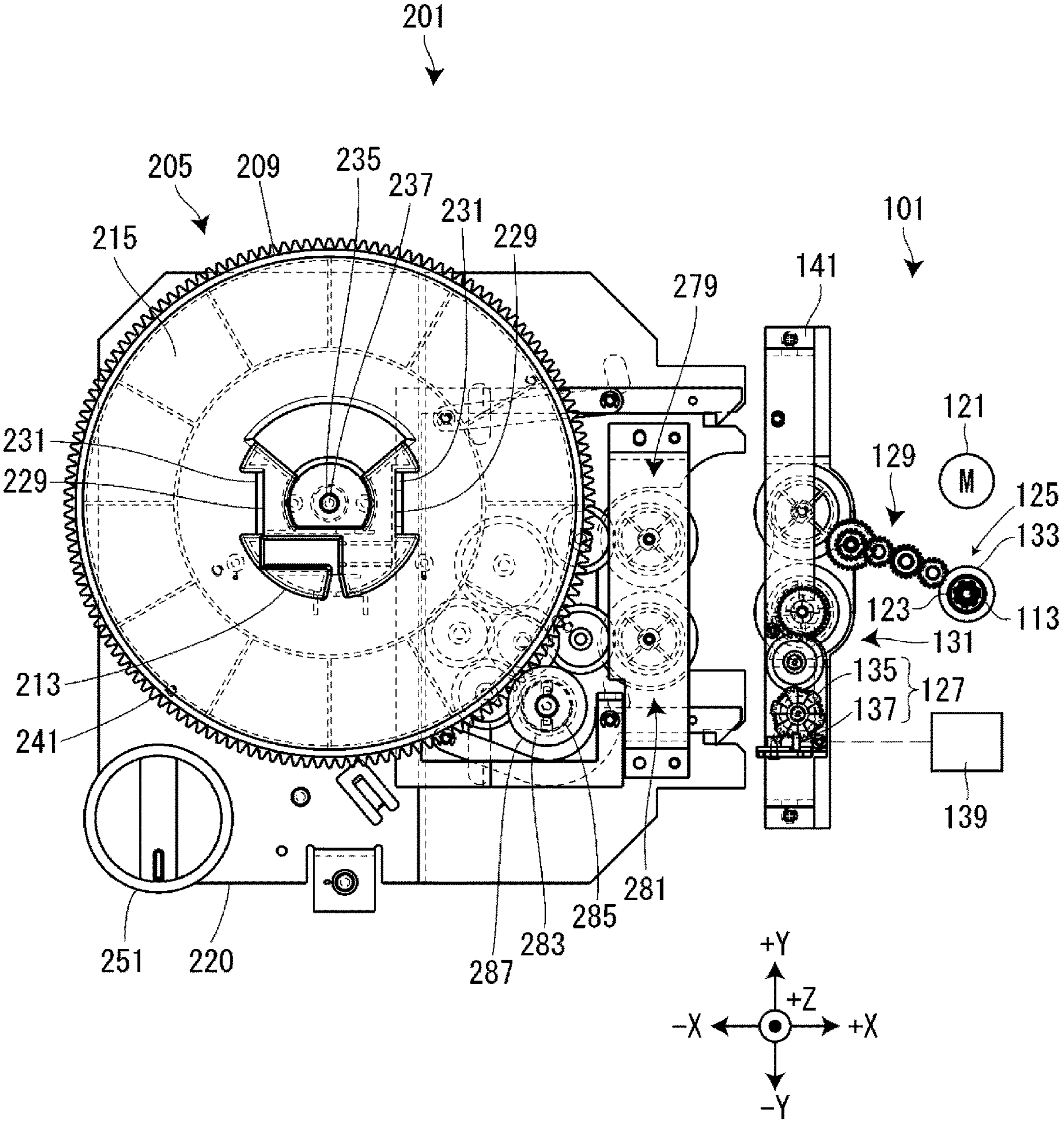
FIG. 7 is a diagram illustrating a gear train of the tape printing device and a gear train of the winding device.

A gear train provided in the tape printing device 101 and the winding device 201, and a detection section 127 provided in the tape printing device 101 will be described based on FIG. 7. The tape printing device 101 is provided with a print-side first gear train 129 and a print-side second gear train 131. The input-side gear of the print-side first gear train 129 meshes with the output-side gear of a feed gear train 125, that is, a platen gear 133 that rotates integrally with a platen rotation member 123. The print-side first gear train 129 transmits the motive power input from the feed gear train 125 to a winding-side first gear train 279 described below. The print-side second gear train 131 transmits the motive power input from the winding-side second gear train 281 described below to the detection rotating body 135 of the detection section 127.

The detection section 127 detects the rotation speed of the winding section 205. The detection section 127 is provided with the detection rotating body 135 and a photo interrupter 137. It is possible to use a rotary encoder as the detection section 127, for example. The detection rotating body 135 is formed in a plate shape in which a plurality of fan-shaped portions are provided radially. When the detection rotating body 135 rotates, the light emitted from a light emitting element of the photo interrupter 137 to a light receiving element is intermittently blocked by the detection rotating body 135. Accordingly, the photo interrupter 137 outputs a detection signal corresponding to the rotation speed of the detection rotating body 135 to a control section 139 provided in the tape printing device 101. Although not illustrated, the control section 139 is provided with a processor represented by a CPU (Central Processing Unit) and various memories such as a ROM (Read Only Memory) and a RAM (Random Access Memory). A portion of the gears of the print-side first gear train 129, the print-side second gear train 131, and the detection section 127 are supported by a print-side support plate 141.

The winding device 201 is provided with a winding-side first gear train 279 and a winding-side second gear train 281. The winding-side first gear train 279 transmits the motive power input from the print-side first gear train 129 to the winding section 205. The winding-side first gear train 279 is provided with an intermediate gear 283, a torque limiter 285, and the output gear 287. The intermediate gear 283, the torque limiter 285, and the output gear 287 are provided coaxially with each other. The torque limiter 285 is provided between the intermediate gear 283 and the output gear 287, and limits the torque transmitted from the intermediate gear 283 to the output gear 287 to a predetermined value. The output gear 287 meshes with the first flange portion 215 of the winding section 205. The output gear 287 also meshes with the input-side gear of the winding-side second gear train 281. The winding-side second gear train 281 transmits the motive power input from the output gear 287 to the print-side second gear train 131. The winding-side first gear train 279 and the winding-side second gear train 281 are supported by a support plate (not illustrated) embedded in the base portion 203.

When the tape printing device 101 and the winding device 201 are connected, the output-side gear of the print-side first gear train 129 and the input-side gear of the winding-side first gear train 279 mesh with each other, and the output-side gear of the winding-side second gear train 281 and the input-side gear of the print-side second gear train 131 mesh with each other. In this state, when the feed motor 121 provided in the tape printing device 101 operates, the motive power of the feed motor 121 is transmitted to the winding section 205 via the feed gear train 125, the print-side first gear train 129, and the winding-side first gear train 279.

Here, the reduction ratios of the feed gear train 125, the print-side first gear train 129, and the winding-side first gear train 279 are set such that the winding speed of the tape 401 by the winding section 205 is fast as compared to the feed speed of the tape 401 by the platen roller. Therefore, the tape 401 is wound around the winding section 205 in a state in which the tape 401 is under tension. The output gear 287 meshing with the first flange portion 215 receives the tension of the tape 401 wound around the winding section 205 and rotates while slipping due to the torque limiter 285. Accordingly, the speed difference between the feed speed of the tape 401 by the platen roller and the winding speed of the tape 401 by the winding section 205 is absorbed. The output gear 287 rotates at a rotation speed according to the rotation speed of the winding section 205. The winding section 205 rotates with a constant torque limited by the torque limiter 285.

The motive power of the feed motor 121 is not only transmitted to the first flange portion 215 but also transmitted from the output gear 287 to the detection rotating body 135 via the winding-side second gear train 281 and the print-side second gear train 131. Therefore, the detection rotating body 135 rotates at a rotation speed according to the rotation speed of the winding section 205. Accordingly, the detection section 127 detects the rotation speed of the winding section 205. In other words, the control section 139 acquires the rotation speed of the winding section 205 based on the detection signal output from the photo interrupter 137.

In this manner, the winding device 201 is capable of causing the tape printing device 101 to detect the rotation speed of the winding section 205 by transmitting the motive power of the output gear 287 that rotates at a rotation speed corresponding to the rotation speed of the winding section 205 to the tape printing device 101 using the winding-side second gear train 281 without itself being provided with a detector that detects the rotation speed of the winding section 205. As described above, the winding device 201 is capable of causing the winding section 205 to rotate by transmitting the motive power input from the tape printing device 101 to the winding section 205 using the winding-side first gear train 279 without itself being provided with the drive source of the winding section 205. According to these configurations, it is not necessary for the winding device 201 to include an electrical circuit and it is possible to improve the reliability of the winding device 201.

[Flange Moving Section]

A flange moving section 245 will be described based on FIGS. 4 to 6. The flange moving section 245 is for moving the first flange portion 215 in the Z direction, that is, in the extending direction of the winding shaft 237 so as to be possible to position. As described above, in the tape printing device 101, the tape 401 is fed in a state in which the positions of both ends of the tape 401 in the width direction are different for every width of the tape 401. Therefore, also in the winding device 201, the tape 401 is fed to the winding section 205 in a state in which the positions of both ends of the tape 401 in the width direction are different for every width of the tape 401. In order to handle this, the winding device 201 is provided with the flange moving section 245 that moves the winding section 205 in the extending direction of the winding shaft 237 such that the first flange portion 215 moves to be possible to position at the six flange positions corresponding to the widths of the six types of the tape 401.

The flange moving section 245 is provided with a cylindrical cam 247, a flange moving gear 249, a dial 251, and a hook 253.

The cylindrical cam 247 is configured to be rotatable around a rotation axis parallel to the extending direction of the winding shaft 237. The cylindrical cam 247 is provided with a cam main body 255 provided on the +Z side and a cam gear portion 257 provided on the −Z side. The cam main body 255 and the cam gear portion 257 are formed integrally.

The cam main body 255 is formed in a cylindrical shape. The groove-shaped cam-side engaging portion 259 that goes around the cam main body 255 is provided in the circumferential surface of the cam main body 255. The flange-side engaging portion 227 is engaged with the cam-side engaging portion 259. When the cylindrical cam 247 rotates, the flange-side engaging portion 227 engaged with the cam-side engaging portion 259 moves in the extending direction of the winding shaft 237. Accordingly, the first flange portion 215 to which the flange-side engaging portion 227 is fixed moves integrally with the flange-side engaging portion 227 in the extending direction of the winding shaft 237. The cylindrical cam 247 is an example of the “cam” of the present invention.

The cam-side engaging portion 259 is provided with six cam-side maintenance engaging portions 261 and six cam-side movement engaging portions 263. The cam-side maintenance engaging portions 261 and the cam-side movement engaging portions 263 are provided alternately in the circumferential direction of the cam main body 255. In other words, the cam-side movement engaging portions 263 are provided to connect one of the cam-side maintenance engaging portions 261 and another of the cam-side maintenance engaging portions 261 to each other.

The six cam-side maintenance engaging portions 261 are provided at positions corresponding to the six flange positions in the extending direction of the winding shaft 237. In other words, when the cam-side engaging portion 259 is engaged with the flange-side engaging portion 227 in the cam-side maintenance engaging portions 261, the first flange portion 215 is positioned at one flange position of the six flange positions. The cam-side maintenance engaging portions 261 are provided substantially parallel to the surface perpendicular to the extending direction of the winding shaft 237. Furthermore, the cam-side maintenance engaging portion 261 has a predetermined length in the circumferential direction for engaging with the flange-side engaging portion 227. Accordingly, when the cylindrical cam 247 rotates, the first flange portion 215 is maintained in one flange position without moving in the extending direction of the winding shaft 237 while the cam-side engaging portion 259 is engaged with the flange-side engaging portion 227 in the cam-side maintenance engaging portions 261.

On the other hand, the cam-side movement engaging portion 263 is provided to obliquely intersect the surface perpendicular to the extending direction of the winding shaft 237. Therefore, when the cylindrical cam 247 rotates, the first flange portion 215 moves between one flange position and another adjacent flange position while the cam-side engaging portion 259 is engaged with the flange-side engaging portion 227 in the cam-side movement engaging portion 263.

In this manner, the cam-side engaging portion 259 is capable of moving the first flange portion 215 to be possible to position at the six flange positions by being provided with the six cam-side maintenance engaging portions 261 that maintain the first flange portion 215 at one of the flange positions and the six cam-side movement engaging portions 263 that move the first flange portion 215 between one flange position and the other adjacent flange positions.

In the cam-side engaging portion 259, of the two wall portions in the extending direction of the winding shaft 237, the wall portion on the +Z side, that is, the wall portion on the first flange portion 215 side functions as a retaining portion 265. In other words, the retaining portion 265 keeps the engaging protrusion portion 243 in a retained state with respect to the cam-side engaging portion 259. Accordingly, when the winding main body 209 is pulled to the +Z side by the user, the engaging protrusion portion 243 being disengaged from the cam-side engaging portion 259 is suppressed.

The cam gear portion 257 is formed in a disc shape having a smaller diameter than the cam main body 255. The cam gear portion 257 meshes with the flange moving gear 249.

The dial 251 is for operating the cylindrical cam 247. The dial 251 is provided with the handle portion 267 and the dial main body 269. The dial main body 269 is accommodated inside the base portion 203 and is connected to the handle portion 267 to rotate integrally with the handle portion 267. The dial main body 269 is provided with a dial cylindrical portion 271 provided on the +Z side and a dial gear portion 273 provided on the −Z side. The dial cylindrical portion 271 and the dial gear portion 273 are formed integrally. The dial cylindrical portion 271 is formed in a substantially cylindrical shape and six dial-side engaging concave portions 275 are provided on the circumferential surface thereof at equal intervals in the circumferential direction. Therefore, the user is capable of easily grasping the position of the dial 251, that is, the engagement position of the cam-side maintenance engaging portion 261 and the flange-side engaging portion 227. The dial gear portion 273 is formed in a disc shape having a smaller diameter than the dial cylindrical portion 271. The dial gear portion 273 meshes with the flange moving gear 249. Therefore, when the user holds the handle portion 267 and rotates the dial 251, the flange moving gear 249 rotates and the cam gear portion 257 and the cylindrical cam 247 also rotate. Although the six dial-side engaging concave portions 275 are provided at equal intervals in the circumferential direction, the six dial-side engaging concave portions 275 may not be provided at equal intervals. The dial 251 is an example of the “operating portion” in the present invention.

The hook 253 is supported by a hook support shaft (not illustrated) to be capable of pivoting. A hook-side engaging portion 277 is provided at the tip of the hook 253. A force is applied to the hook 253 by a hook spring (not illustrated) counterclockwise when viewed from the +Z side, that is, in a pivoting direction in which the hook-side engaging portion 277 is directed toward the rotation center of a dial main body 269. Therefore, the hook 253 restricts the pivoting of the dial 251 by engaging with the dial-side engaging concave portion 275 provided in the dial cylindrical portion 271. It is possible to use a torsion coil spring provided on a hook support shaft as the hook spring, for example. The hook 253 is an example of the “operation restricting portion” in the present invention. The dial-side engaging concave portion 275 is an example of the “restriction engaging portion” in the present invention.

Here, the six dial-side engaging concave portions 275 correspond to the six cam-side maintenance engaging portions 261 provided on the cylindrical cam 247. In other words, when the cam-side engaging portion 259 engages with the flange-side engaging portion 227 in the cam-side maintenance engaging portion 261, the dial-side engaging concave portion 275 is provided at a position at which the dial cylindrical portion 271 engages with the hook 253. Accordingly, when the hook 253 engages with the dial-side engaging concave portion 275, the cam-side engaging portion 259 engages with the flange-side engaging portion 227 in the cam-side maintenance engaging portions 261. Therefore, when the dial 251 rotates to the rotation position at which the hook 253 engages with the dial-side engaging concave portion 275, that is, to the rotation position at which the rotation of the dial 251 is restricted by the hook 253, the cam-side engaging portion 259 engages with the flange-side engaging portion 227 in the cam-side maintenance engaging portions 261 and the first flange portion 215 moves to one flange position. In other words, the user is capable of moving the first flange portion 215 to one flange position by rotating the dial 251 to the rotation position at which the rotation of the dial 251 is restricted, that is, to the rotation position at which the user senses a click.

The rotation of the cylindrical cam 247 is restricted by the hook 253 via the dial main body 269 and the flange moving gear 249. Therefore, when the winding section 205 is rotating, the cylindrical cam 247 being rotated by the rotational force of the winding section 205 is suppressed. Therefore, the first flange portion 215 moving in the extending direction of the winding shaft 237 against the intention of the user when the winding section 205 is rotating is suppressed.

Figure 8:
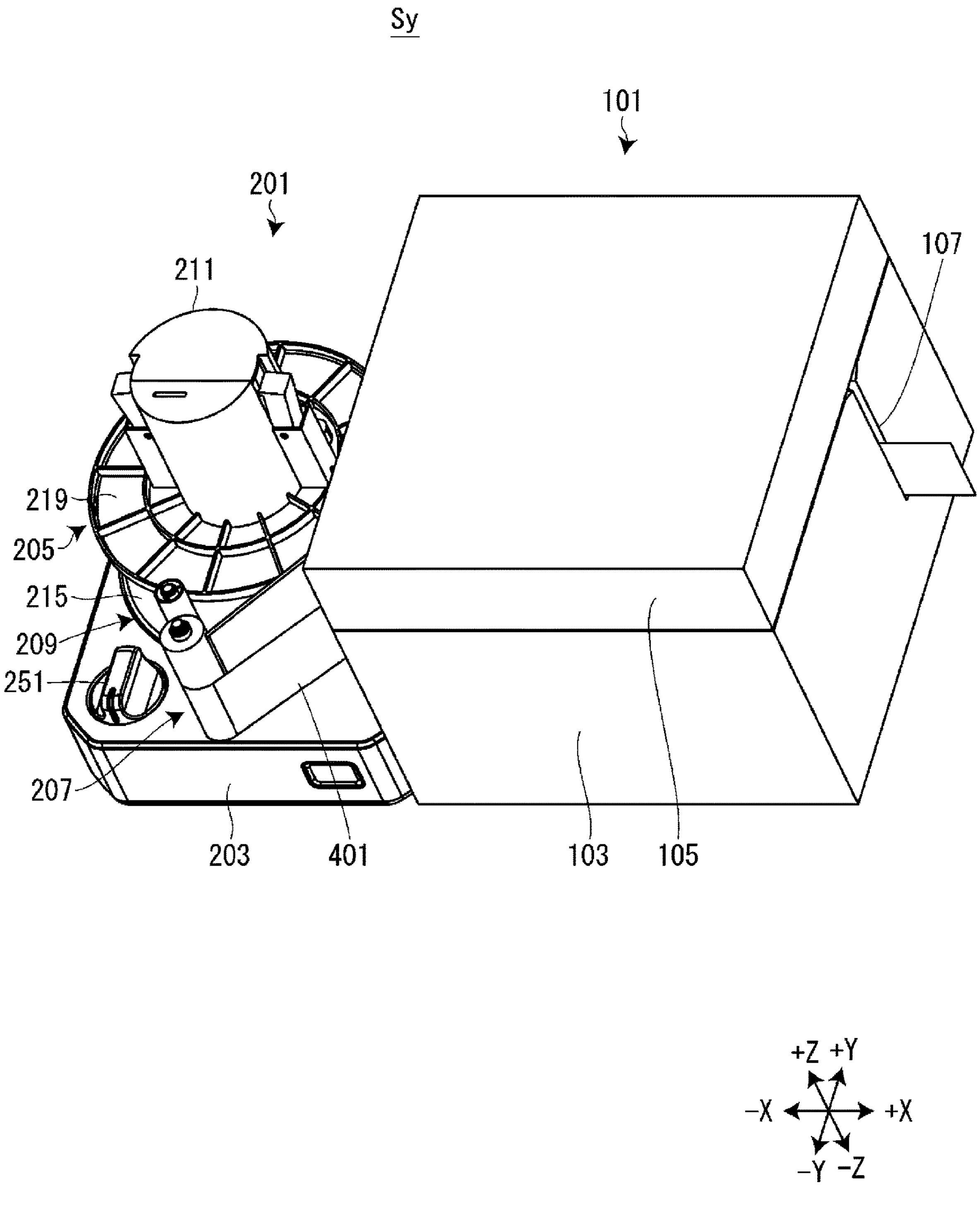
FIG. 8 is a diagram illustrating a state in which the tape fed from the tape printing device is wound by the winding device.
Figure 9:
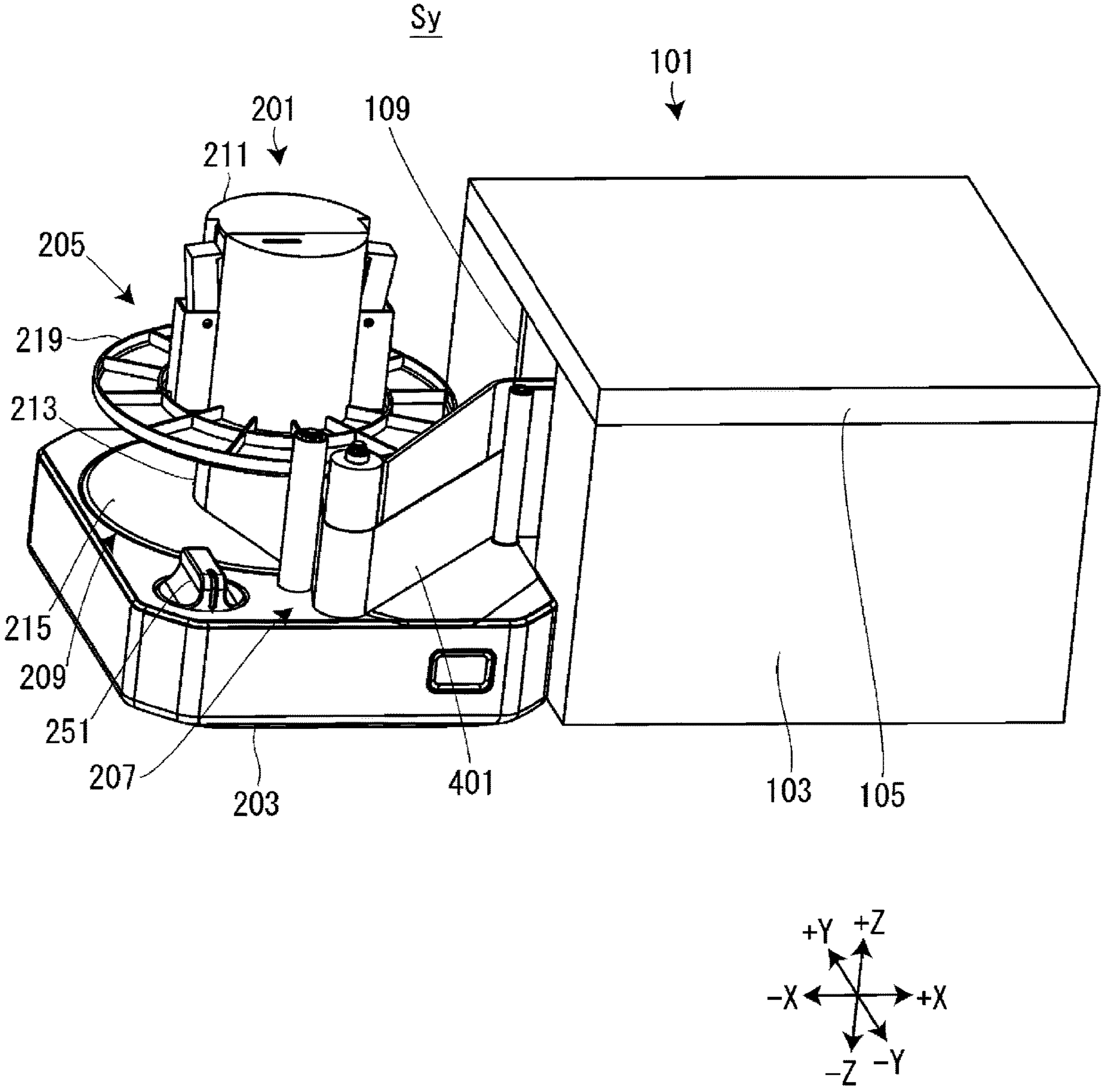
FIG. 9 is a diagram illustrating a state in which the tape fed from the tape printing device is wound by the winding device, as viewed from a different angle from FIG. 8.

Furthermore, the winding attachment body 211 is attached to the winding main body 209 according to the width of the tape 401, so that the tape 401 fed from the tape printing device 101 is wound around the winding core portion 213 while being guided by the first flange portion 215 and the second flange portion 219 (refer to FIGS. 8 and 9).

As described above, the winding device 201 of the present embodiment is provided with the winding shaft 237, the winding core portion 213, the first flange portion 215, the flange-side engaging portion 227, and the flange moving section 245. The winding core portion 213 is provided on the winding shaft 237 to be rotatable. The tape 401 is wound around the winding core portion 213. The first flange portion 215 is provided to be movable with respect to the winding shaft 237 in the extending direction of the winding shaft 237. The first flange portion 215 guides the tape 401 wound around the winding core portion 213 in the width direction of the tape 401. The flange-side engaging portion 227 is capable of moving integrally with the first flange portion 215. The flange moving section 245 is provided with a cylindrical cam 247. The cylindrical cam 247 is provided with the cam-side engaging portion 259 that engages with the flange-side engaging portion 227. The flange moving section 245 moves the first flange portion 215 to be possible to position at the plurality of flange positions corresponding to the widths of the tapes 401.

According to this configuration, when the cylindrical cam 247 rotates, the first flange portion 215 is positioned to move to the flange position corresponding to the width of the tape 401. Therefore, it is possible to easily move the first flange portion 215 to the flange position corresponding to the width of the tape 401.

Modification Example

It is needless to say that the present invention is not limited to the above embodiment and various configurations may be adopted without departing from the spirit of the present invention. For example, it is possible to modify the embodiment into the following forms in addition to those described above.

The "cam-side engaging portion" of the present invention is not limited to the configuration including the cam-side maintenance engaging portion 261 and the cam-side movement engaging portion 263 as in the cam-side engaging portion 259, and a configuration may be adopted in which, for example, the entirety of the cam-side engaging portion 259 obliquely intersects the surface perpendicular to the extending direction of the winding shaft 237. In other words, a configuration may be adopted in which the winding section 205 constantly moves in the extending direction of the winding shaft 237 while the cylindrical cam 247 is rotating. In this configuration, the six dial-side engaging concave portions 275 correspond to the six flange positions. In other words, when the first flange portion 215 is positioned at the flange position, the dial-side engaging concave portions 275 are provided at positions at which the dial-side engaging concave portions 275 engage with the hook 253 in the dial cylindrical portion 271. Accordingly, when the hook 253 engages with the dial-side engaging concave portions 275, the first flange portion 215 is positioned at the flange position. Therefore, when the dial 251 rotates to the rotation position at which the hook 253 engages with the dial-side engaging concave portion 275, the first flange portion 215 moves to the flange position. Therefore, even in this configuration, the user is capable of moving the first flange portion 215 to the flange position by rotating the dial 251 to the rotation position at which the rotation of the dial 251 is restricted.

The "continuous medium" of the present invention is not limited to a tape-form continuous medium such as the tape 401 and may be roll paper, for example. The length, width and material of the "continuous medium" are not particularly limited.

The "winding core portion" and the "flange portion" of the present invention are not limited to a integrally formed configuration as with the winding core portion 213 and the first flange portion 215, and may be formed separately. In this case, the "flange portion" may be fixed to the "winding core portion" or may be attached to the "winding core portion" to be capable of moving.

The "cam" of the present invention is not limited to the cylindrical cam 247, and a plate cam, a linear motion cam, or the like may be used, for example.

The "flange-side engaging portion" and the "cam-side engaging portion" of the present invention are not limited to a configuration in which the "flange-side engaging portion" is convex and the "cam-side engaging portion" is concave as with the flange-side engaging portion 227 and the cam-side engaging portion 259. For example, conversely, the "flange-side engaging portion" may be concave and the "cam-side engaging portion" may be convex.

The "restriction engaging portion" of the present invention is not limited to the configuration in which the restriction engaging portion is provided on the dial 251 as in the dial-side engaging concave portion 275, and a configuration may be adopted in which the restriction engaging portion is provided on the cylindrical cam 247, for example.

The "printing device" of the present invention may be applied to the tape printing device 101 of the present embodiment. In other words, a configuration may be adopted in which the tape printing device 101 is provided with the similar components to the winding shaft 237, the winding core portion 213, the first flange portion 215, the flange-side engaging portion 227, and the flange moving section 245 of the present embodiment. In other words, the tape printing device 101 and the winding device 201 may be configured to be integrated. The "printing device" of the present invention is not limited to the configuration in which the printing is performed on a tape-form object, and the printing may be performed on roll paper, for example. The "printing section" of the present invention is not limited to the one that performs the printing using a thermal system as in a thermal head, and may perform the printing using an ink jet system, an electrophotographic system, or a dot impact system, for example.

REFERENCE SIGNS LIST

101 TAPE PRINTING DEVICE
201 WINDING DEVICE
213 WINDING CORE PORTION
215 FIRST FLANGE PORTION
227 FLANGE-SIDE ENGAGING PORTION
235 SHAFT INSERTION HOLE
237 WINDING SHAFT
243 ENGAGING PROTRUSION PORTION
245 FLANGE MOVING SECTION
247 CYLINDRICAL CAM
251 DIAL
253 HOOK
259 CAM-SIDE ENGAGING PORTION
261 CAM-SIDE MAINTENANCE ENGAGING PORTION
263 CAM-SIDE MOVEMENT ENGAGING PORTION
265 RETAINING PORTION
275 DIAL-SIDE ENGAGING CONCAVE PORTION
401 TAPE

The invention claimed is:

1. A winding device comprising:
a winding shaft;
a winding core portion that is provided to be rotatable on the winding shaft and that winds a continuous medium;
a flange portion that is provided on the winding shaft to be movable in an extending direction of the winding shaft and that guides the continuous medium wound around the winding core portion in a width direction of the continuous medium;
a flange-side engaging portion capable of moving integrally with the flange portion; and
a flange moving section that includes a cam provided with a cam-side engaging portion that engages with the flange-side engaging portion and that moves the flange portion to a plurality of flange positions.

2. The winding device according to claim 1, wherein
the cam-side engaging portion includes
a cam-side maintenance engaging portion that maintains the flange portion at the flange position, and
a cam-side movement engaging portion that moves the flange portion between the flange positions.

3. The winding device according to claim 2, wherein
the flange moving section includes
an operating portion for operating the cam, and
an operation restricting portion that restricts the operating portion by engaging with a restriction engaging portion, and
the cam-side engaging portion engages with the flange-side engaging portion in the cam-side maintenance engaging portion when the operation restricting portion engages with the restriction engaging portion.

4. The winding device according to claim 1, wherein
the flange moving section includes
an operating portion for operating the cam, and
an operation restricting portion that restricts the operating portion by engaging with a restriction engaging portion, and
the flange portion is positioned at the flange position when the operation restricting portion engages with the restriction engaging portion.

5. The winding device according to claim 1, wherein
the flange portion is provided with a shaft insertion hole into which the winding shaft is inserted, and
the flange portion is positioned in directions intersecting the extending direction of the winding shaft due to the winding shaft being inserted into the shaft insertion hole.

6. The winding device according to claim 1, wherein
the cam is rotatable around a rotation axis parallel to the extending direction of the winding shaft, and
the flange portion moves in the extending direction of the winding shaft due to rotation of the cam.

7. The winding device according to claim 1, wherein
the cam-side engaging portion is provided in a groove shape in a circumferential surface of the cam, and
the flange-side engaging portion includes an engaging protrusion portion that engages with the cam-side engaging portion.

8. The winding device according to claim 7, wherein
of two wall portions in the extending direction of the winding shaft in the cam-side engaging portion, the wall portion on a flange portion side functions as a retaining portion that renders the engaging protrusion portion in a retained state with respect to the cam-side engaging portion.

9. The winding device according to claim 1, wherein
the flange portion and the winding core portion are formed integrally.

10. The winding device according to claim 1, wherein
the flange portion is fixed to the winding core portion.

11. A printing device comprising:
a printing section that performs printing on a continuous medium;
a winding shaft;
a winding core portion that is provided to be rotatable on the winding shaft and that winds the continuous medium;
a flange portion that is provided on the winding shaft to be movable in an extending direction of the winding shaft and that guides the continuous medium wound around the winding core portion in a width direction of the continuous medium;
a flange-side engaging portion capable of moving integrally with the flange portion; and
a flange moving section that includes a cam provided with a cam-side engaging portion that engages with the flange-side engaging portion and that moves the flange portion to a plurality of flange positions.

* * * * *